United States Patent
Schumacher

[11] Patent Number: 6,142,181
[45] Date of Patent: Nov. 7, 2000

[54] 3/3-WAY VALVE

[75] Inventor: Josef Schumacher, Reutlingen, Germany

[73] Assignee: DaimlerChrysler AG, Stuttgart, Germany

[21] Appl. No.: 09/248,290

[22] Filed: Feb. 11, 1999

[30] Foreign Application Priority Data

Feb. 11, 1998 [DE] Germany .......................... 198 05 478

[51] Int. Cl.$^7$ .......................... F16K 11/07; F16K 11/074
[52] U.S. Cl. .............................. 137/625.21; 137/625.67; 137/625.68
[58] Field of Search ................... 137/625.67, 625.68, 137/625.21

[56] References Cited

U.S. PATENT DOCUMENTS

| 5,325,891 | 7/1994 | Mateja | 137/625.68 X |
| 5,577,534 | 11/1996 | Ward | 137/625.65 X |
| 5,829,396 | 11/1998 | Sturman et al. | 137/625.65 X |
| 5,937,904 | 8/1999 | Wunder | 137/625.65 |

FOREIGN PATENT DOCUMENTS

| 0 325 200 | 7/1989 | European Pat. Off. . |
| 24 986 | 4/1963 | Germany . |
| 40 40 797 | 7/1992 | Germany . |
| 1241058 | 7/1971 | United Kingdom . |
| 2294311 | 4/1996 | United Kingdom . |

*Primary Examiner*—Gerald A. Michalsky
*Attorney, Agent, or Firm*—Evenson, McKeown, Edwards & Lenahan, P.L.L.C.

[57] ABSTRACT

A 3/3-way valve with a control member received in a valve chamber is provided. The member, in three control positions, blocks a consumer opening and a relief opening (maintain pressure), connects the consumer opening with a supply opening and blocks the relief opening (increase pressure), and connects the consumer opening with the relief opening and blocks the supply opening (reduce pressure). To reduce manufacturing costs for a 3/3-way valve of this kind, two chamber sections delimited by the control member in the valve chamber are constantly connected with one another and the three openings are arranged at certain intervals apart from one another. The adjustment is made such that the control member in one control position covers the consumer opening and the relief opening, in another control position covers only the relief opening, and in another control position covers only the supply opening.

14 Claims, 2 Drawing Sheets

3/3-WAY VALVE

BACKGROUND AND SUMMARY OF THE INVENTION

This application claims the priority of German Application No. 198 05 478.5, filed Feb. 11, 1998, the disclosure of which is expressly incorporated by reference herein.

The invention relates to a 3/3-way valve and, more particularly, to a 3/3-way valve with a valve chamber formed in a valve housing, said chamber having a connecting opening for a fluid source and a fluid consumer as well as a relief opening, and with a control member movable in the valve chamber relative to the latter in three control positions, in which positions a maintenance of pressure, an increase of pressure, and a reduction of pressure are produced in the fluid consumer.

With such a fluidic control valve, the control functions ("maintain pressure," "increase pressure," and "reduce pressure") are possible in the three control positions of the valve in a connected fluid consumer. 3/3-way valves of this kind are usually designed as slide valves, for example as lengthwise slide valves, in which a control piston with a plurality of grooves opens and closes the connecting openings alternately in a cylinder bore. All manual, mechanically, electrical, and pneumatic actuating modes are possible for actuating and returning the lengthwise slide valve. In designing such slide valves as plate slide valves which, as a rule, are operated only by hand or foot, a rotary motion of the slide is required to switch the valve.

Because of the geometry of the slide and the valve chamber which is usually made in the form of a housing bore, slide valves of this kind require a relatively high manufacturing cost, mainly due to the exact fit of the slide in the housing bore. Due to the geometric shape of the slide and the housing bore, it is very difficult to seal the individual chamber sections off from one another in the three control positions of the control slide.

A hydraulic 2/2-way valve is already known, such as in DD 24 986, in which the valve chamber is divided into two chamber sections by a control piston. The sections are connected with one another by a through bore in the control piston. A supply line from a hydraulic source terminates in one chamber section, and a feed line to a consumer departs from the other section. The connecting openings for the hydraulic source and consumer are arranged so that the control piston in its basic position abuts the end wall of one chamber section, closing the connecting opening to the consumer, and clears this opening after a control stroke, while the connecting opening for the hydraulic source is not controlled. A second piston that is rigidly connected with the control piston seals off this connecting opening to prevent loss by leakage. The fact that the control piston abuts the end wall of the chamber section in the basic position and shuts off the consumer opening at the same time means that no overlap is required when switching the control piston. This is done so that the control stroke of the control piston can be made very small and approximately corresponds to the inside diameter of the connecting opening. This small piston stroke shortens the switching time of the control valve considerably. The preferred area of application of the known 2/2-way valve is hydraulic digital computers.

A known compressed-air valve that constitutes a 4/2-way valve, such as in DE 40 40 797 A1, has a control member designed as a disk with a surrounding sealing ring. The disk extends in a plane that is diagonal with respect to the valve chamber axis and is mounted nonrotatably on a shaft coaxial with the chamber axis. Each two valve connecting openings in the form of radial bores are located on diametrical sides of the valve chamber, and are offset axially with respect to one another in such fashion that each pair of openings terminates in one of the chamber sections of the valve chamber that is separated from one another by the disk. In one control position of the control member, the openings of the pair of openings that terminate in one chamber section are connected with one another, and in a second control position rotated through 180 degrees, each pair of openings located diametrically opposite one another in each chamber section are connected with one another.

The goal of the invention is to improve a 3/3-way valve of the above-mentioned type by reducing its manufacturing costs.

The goal is achieved according to the invention by a 3/3-way valve with a valve chamber formed in a valve housing, said chamber having a connecting opening for a fluid source and a fluid consumer as well as a relief opening, and with a control member movable in the valve chamber relative to the latter in three control positions, in which positions a maintenance of pressure, an increase of pressure, and a reduction of pressure are produced in the fluid consumer. The valve chamber is divided by the control member into two chamber sections delimited thereby, said sections being in a fluid exchange connection with one another. The three openings are arranged relative to one another at certain intervals. The control member in one control position blocks the consumer opening and the relief opening, in another control position covers only the relief opening, and in an additional control position covers only the supply opening.

The 3/3-way valve according to the invention has the advantage that the control piston, despite the three control positions required for 3-way control, divides the valve chamber into only two chamber sections. These two chamber sections are permanently connected with one another. Not only can the control member be designed to be very much more simple from the manufacturing standpoint, but also the sealing off of the control member from the housing bore poses much less of a problem. This is because the control member, in all of the control positions, is only required to cover the valve connection openings, namely only one valve connecting opening in each of two control positions and a total of two valve connecting openings in one control position, and no longer a plurality of chamber sections. In the design of the valve as a lengthwise slide valve, a simple cylindrical displacement piston with a central piston rod for its actuation suffices as the control member. The piston is guided displaceably in a valve chamber in the valve housing designed as a cylindrical bushing. In the design of the valve as a plate valve, the control member is a disk with control segments that fit flat against the end faces of the lid surfaces delimiting the cylindrical valve chamber endwise. In both cases, in successive control positions of the control member, the desired control functions "maintain pressure," "increase pressure," and "reduce pressure" are possible in its actuation direction. High tolerance requirements are not imposed on the manufacture of these valves. The control member can be sealed by sealing rings, which are made for example in the lengthwise slide version of the valve as simple O-rings, which can be placed in an annular groove on the circumference of the piston or in annular grooves in the inside wall of the cylinder bore between the three openings.

Advantageous embodiments of the 3/3-way valve according to the invention are shown and described herein.

Other objects, advantages and novel features of the present invention will become apparent from the following detailed description of the invention when considered in conjunction with the accompanying drawings.

DETAILED DESCRIPTION OF THE DRAWINGS

Figure 1:
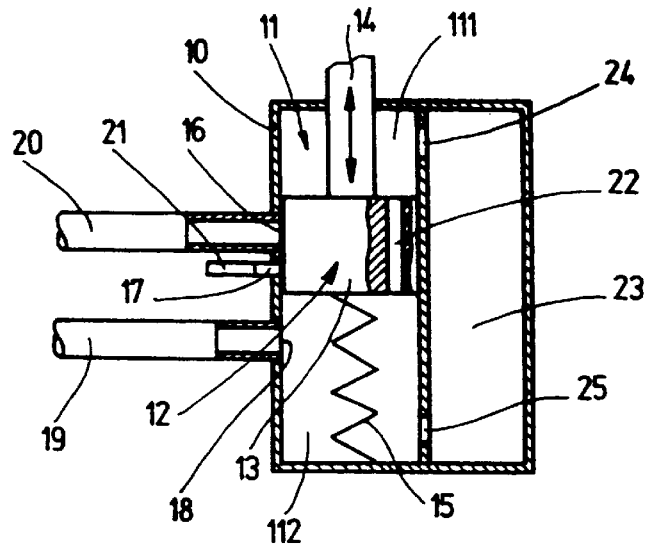
FIGS. 1 to 3 each show a lengthwise section of a 3/3-way valve designed as a lengthwise slide valve in three different control positions.
Figure 2:
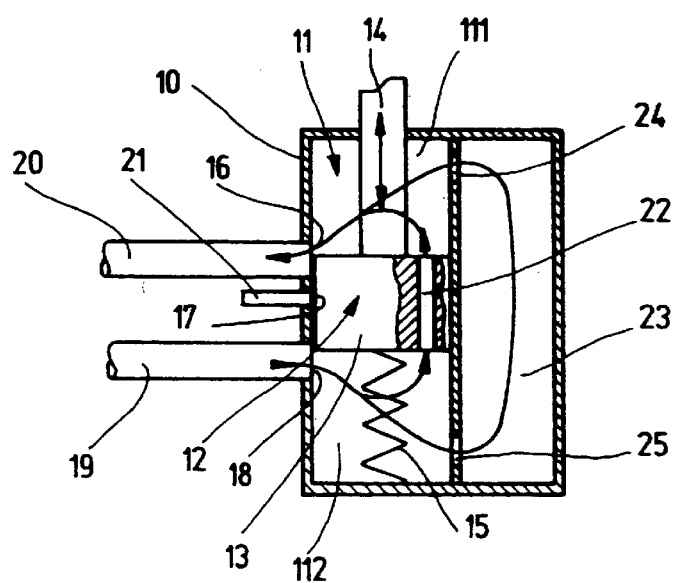
Figure 3:
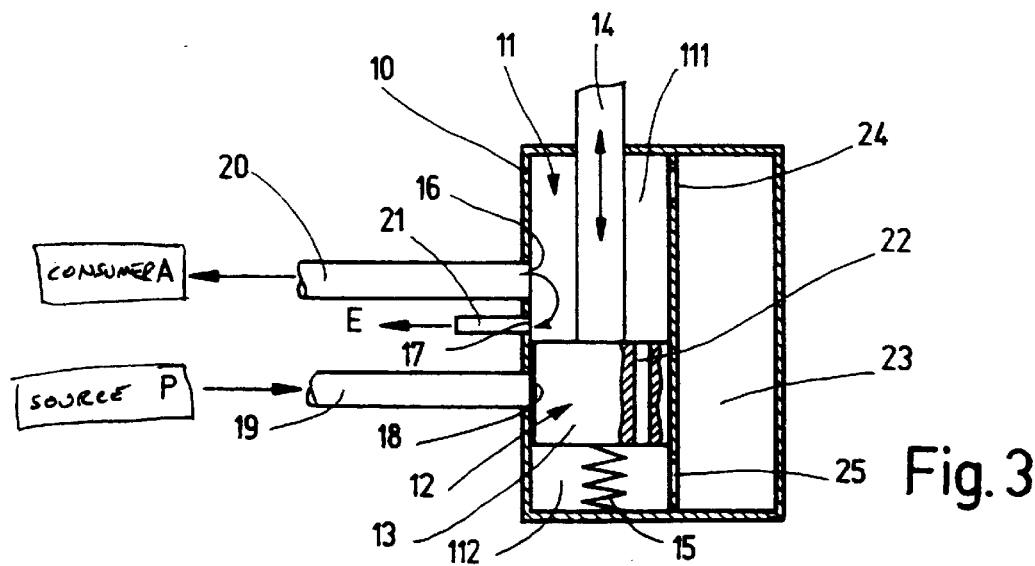

The 3/3-way valve shown in three different control positions schematically in lengthwise section in FIGS. 1 to 3 is preferably used as a pneumatic control valve for filling and venting air cushions in orthopedic vehicle seats. It has a valve housing 10 in which a valve chamber 11, preferably in the form of a cylindrical bore, is formed. A control member 12 is received in valve chamber 11. The member 12 divides valve chamber 11 into two chamber sections 111 and 112. The chamber sections are fluidically coupled with one another in a fluid exchange manner, so that with the pneumatic control valve in each chamber section 111 and 112, the same air pressure is set. In the embodiment shown in FIGS. 1–3, control member 12 is designed as a simple displacement piston 13, guided axially in valve chamber 11 and displaceable by means of a piston rod 14 against the force of a return spring 15, with the two chamber sections 111,112 changing their chamber volumes. Within the displacement range of displacement piston 13, three openings 16–18 located side-by-side in the direction of movement of displacement piston 13 are provided radially in the cylindrical wall of valve chamber 11. The openings 16–18 are provided centrally between the two chamber sections 111,112. The consumer opening 16 is connected by a supply line 20 with a consumer A and supply opening 18 is connected by a supply line 19 with a fluid source P, while relief opening 17 (located between consumer opening 16 and supply opening 18) is connected to a relief line 21. When a liquid fluid is used, for example hydraulic oil, the relief line 21 has a return line that leads to a collecting chamber, and when a gaseous fluid is used, the relief line 21 is opened to the atmosphere. During the use of the above-described 3/3-way valve, namely in orthopedic vehicle seats, the supply line 19 is connected to a source of compressed air, for example a compressed air generator and/or compressed air reservoir, and the supply line 20 is connected to at least one air cushion in the orthopedic seat. Relief line 21 terminates in the vicinity of the valve or seat.

The three openings 16 to 18 are arranged at intervals with respect to one another that are adjusted to the length of displacement piston 13 as viewed in the direction of motion, with the adjustment being such that displacement piston 13, as it moves, in its first control position covers consumer opening 16 and relief opening 17, in its second control position covers only relief opening 17, and in its third control position covers only supply opening 18. In this manner, consumer opening 16 is closed in the first control position, so that the pressure set in consumer A is maintained and, at the same time, relief opening 17 is closed, so that the fluid flowing in from fluid source P through supply opening 18 cannot escape through relief opening 17. In the second control position, consumer opening 16 is connected with supply opening 18, so that fluid can flow from fluid source P into consumer A in order to increase the pressure set therein. In the third control position, consumer opening 16 and relief opening 17 are connected with one another, so that fluid can flow from consumer A through consumer opening 16 and relief opening 17 in order to reduce the pressure set in consumer A. The second and third control positions can also be exchanged.

As already mentioned, in all control positions of displacement piston 13, the two chamber sections 111,112 are always connected with one another. This constant connection of chamber sections 111 and 112 is produced by a through bore 22 in displacement piston 13. Alternatively or in addition, however, the connection between the two chamber sections 111,112 can also be produced by a connecting channel 23 formed in the valve housing 10. As shown in the embodiment in FIGS. 1–3, the channel may extend on the back of valve chamber 11 and be connected by bores 24, 25 in the cylinder wall of valve chamber 11 with the two chamber sections 111,112.

Figure 4:
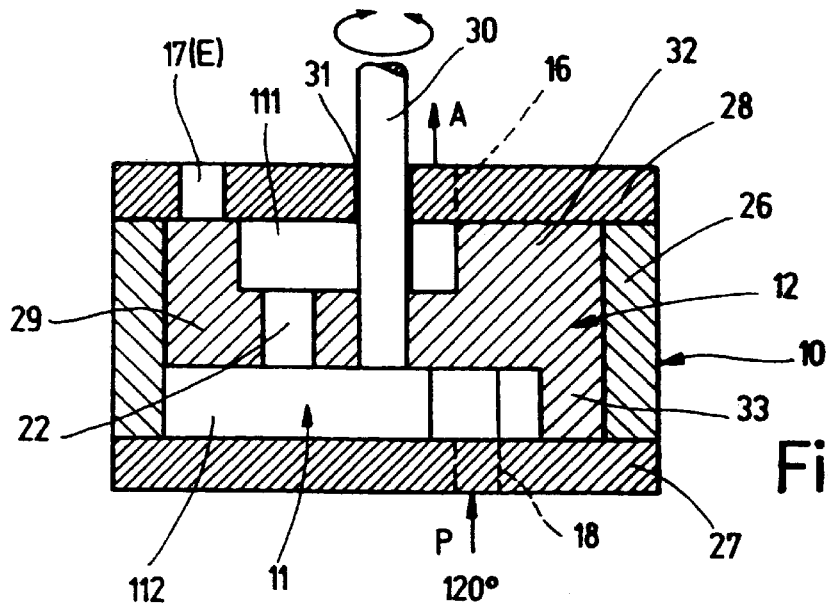
FIG. 4 shows a lengthwise section taken along line IV—IV in FIG. 5 of a 3/3-way valve designed as a plate slide valve.
Figure 5:
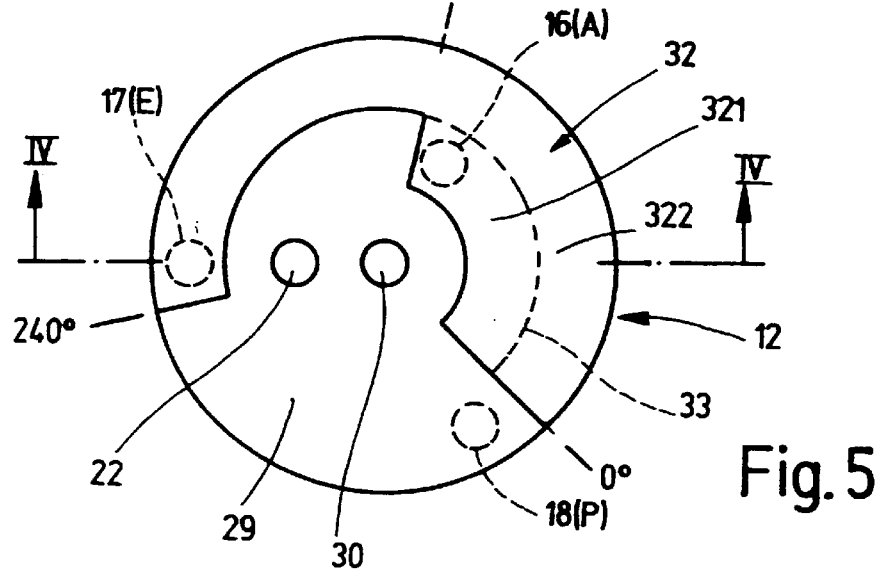
FIG. 5 is a top view of a control member in the plate slide valve according to FIG. 4.
Figure 6:
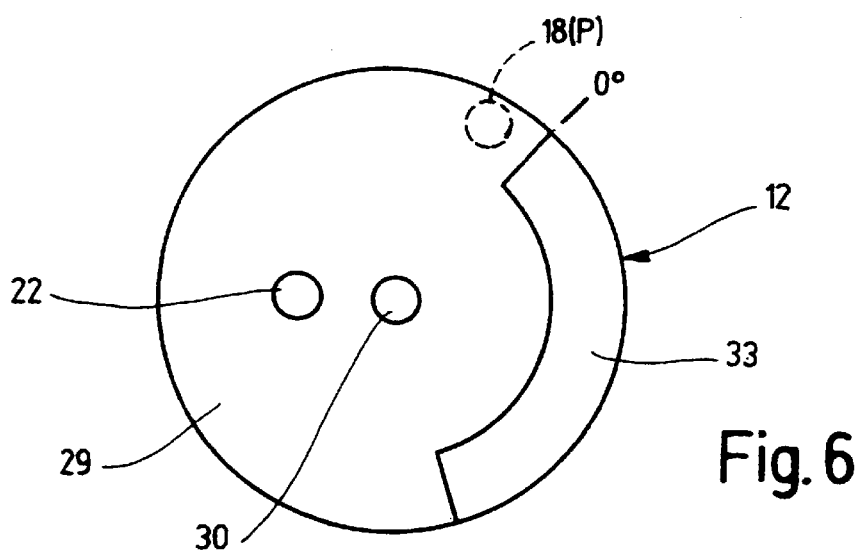
FIG. 6 is a bottom view of the control member in FIG. 5.

The embodiment of the 3/3-way valve shown in FIGS. 4–6 in various views is designed as a plate slide valve, in which a rotary movement is required to switch the valve. Valve housing 10, designed in the shape of a can, is composed of a hollow cylinder 26 and two lid flanges 27, 28 that abut hollow cylinder 26 endwise. Valve chamber 11 enclosed by valve housing 10 in turn is divided by control member 12, which in this case is designed as a disk 29, into two chamber sections 111,112 that are connected with one another in a fluidic exchange connection by through bore 22 in disk 29. Disk 29 is secured non-rotatably on a pivot pin 30, mounted in a slide bearing 31 in lid flange 28. Pivot pin 30 simultaneously serves for manually switching the 3/3-way valve, which is effected by turning disk 29 through a specified rotational angle.

The supply opening 18 for connecting fluid source P is provided in lid flange 27 and both consumer opening 16 for connecting consumer A and relief opening 17 are provided in the lid flange 28 as axial bores. The three openings 16 to 18 are offset with respect to one another by the same rotational angle in the rotational direction of control member 12. While supply opening 18 and relief opening 17 lie on the same arc, consumer opening 16 on the other hand is offset radially inward. In the embodiment shown in FIGS. 4–6, the three openings 16–18 are offset from one another by 120 degrees each in the circumferential direction, but the offset angle can also be made much smaller to produce smaller adjusting travel of the valve.

In order to control the three openings 16–18, disk 29 has an arcuate disk segment 32 or 33 on each disk surface that projects radially from the surface of the disk, extends up to lid flange 27 or 28, and abuts the inner surface thereof in a sealing fashion. In the disk segment 32 located on top (as viewed) of disk 29, two arcuate segment portions 321 and 322 are formed, with segment portion 321 serving to control consumer opening 16 and segment portion 321 serving to control relief opening 17. The segment portion 321 that is offset radially inward is much shorter, in this case half as long as external segment portion 322. In the embodiment shown in FIGS. 4–6, in accordance with the arrangement of openings 16–18, disk segment 33 for controlling supply opening 18 extends over a circumferential angle of more than 120 degrees on the underside of disk 29, relative to a basic position of 0 degrees in FIG. 5 and ranging from 0 degrees to 120 degrees, segment portion 321 for controlling consumer opening 16 extends on the top of disk 29 in the same angle range. Segment portion 322 for controlling relief opening 17 extends on the top of disk 29 in the rotational angle range between 0 degrees and 240 degrees. If the three relief openings 16 to 18 are offset circumferentially with respect to one another by rotational angles that are smaller but the same, disk segment 33 and segment portions 321 and 322 of disk segment 32 will be made correspondingly shorter.

In FIGS. 5 and 6, disk 29 is shown in its basic position in a top view and a bottom view, respectively. The openings 16 and 17 provided in lid flange 28 are drawn with dot-dashed lines, as is supply opening 18 provided in lid flange 27. In the basic position of disk 29, the valve is in its first control position, in which consumer opening 16 and relief opening 17 are covered by disk segment 32, in other words the pressure controlled in consumer A is maintained. Supply opening 18 is exposed by disk segment 33. If disk 29 is rotated counterclockwise in FIG. 5, consumer opening 16 will be open following a 120-degree rotation, while relief opening 17 remains closed as before and supply opening 18 remains open as before, so that fluid can flow through supply opening 18 and consumer opening 16 to consumer A. As a result, the pressure in consumer A increases. If disk 29 is turned further counterclockwise, then after a total 240 degree rotational angle has been covered, supply opening 18 will be blocked by disk segment 33 and relief opening 17 will be exposed by disk segment 32. Consumer opening 16 is open as before, so that fluid can flow out from consumer A through relief opening 17, so that the pressure in consumer A falls.

To produce shorter adjustment travels it is advantageous to make the rotational angle intervals between openings 16–18 much less than 120 degrees. Disk segment 32, 33 must be made correspondingly shorter. However, it is important to make sure that a range of overlap sufficient for sealing remains between the successive covering and opening of openings 16–18 by control member 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A 3/3-way valve having a housing, comprising:
  a valve chamber formed in the valve housing, said chamber including a supply opening for a fluid source connection with a consumer opening, and a relief opening;
  a control member which divides said valve chamber into first and second chamber sections, said first and second chamber sections being fluidically coupled with one another by a connection opening between said first and second chamber sections, said control member being movable in said valve chamber into a first, a second and a third control position, said first control position maintaining pressure in a fluid consumer through said consumer opening, said second control position increasing pressure in said fluid consumer through said consumer opening by way of said connection opening, and said third control position reducing pressure in said fluid consumer through said consumer opening;
  wherein intervals between said supply, consumer and relief openings are arranged relative to one another such that said control member blocks said consumer opening and relief opening in said first control position, blocks only said relief opening in said second control position, and blocks only said supply opening in said third control position.

2. The valve according to claim 1, wherein said control member has a through bore allowing for the fluid exchange between the first and second chamber sections.

3. The valve according to claim 2, further comprising a channel formed in the valve housing, said channel allowing the fluid exchange between the first and second chamber sections.

4. The valve according to claim 2, wherein the valve housing includes a cylindrical bore forming the valve chamber, the control member being a displacement piston axially displaceably guided within the cylindrical bore, said piston having a piston rod, and further wherein said piston delimits the first and second chamber sections via its end surfaces facing away from one another, said openings being located centrally between the first and second chamber sections in a displacement direction of the displacement piston side-by-side in a wall of the cylindrical bore.

5. The valve according to claim 2, wherein said valve chamber is bounded by a hollow cylinder and lid flanges, said lid flanges being mounted endwise on the hollow cylinder such that said connection opening is formed in one lid flange and said consumer and relief openings are formed in the other lid flange, further wherein said control member is a disk mounted in the lid flange via a rotary pin, said disk dividing said valve chamber into the first and second chamber sections, said disk having on each disk surface a disk segment projecting at right angles therefrom and closely abutting an inner surface of the lid flange for controlling said openings, said disk segment on each disk surface extending in an arcuate shape in a circumferential direction of the disk.

6. The valve according to claim 5, wherein said openings are arranged offset with respect to one another in the circumferential direction of the disk by the same angular amount, said consumer and relief openings being offset radially with respect to one another, a first segment portion of the disk segment being twice as long as a second segment portion of the disk segment which controls said consumer opening, and wherein the disk segment controlling said connection opening and the first segment portion of the disk segment controlling said consumer opening extend over the same angular rotational range on the disk.

7. The valve according to claim 1, further comprising a channel formed in the valve housing, said channel allowing the fluid exchange between the first and second chamber sections.

8. The valve according to claim 7, wherein the valve housing includes a cylindrical bore forming the valve chamber, the control member being a displacement piston axially displaceably guided within the cylindrical bore, said piston having a piston rod, and further wherein said piston delimits the first and second chamber sections via its end surfaces facing away from one another, said openings being located centrally between the first and second chamber sections in a displacement direction of the displacement piston side-by-side in a wall of the cylindrical bore.

9. The valve according to claim 7, wherein said valve chamber is bounded by a hollow cylinder and lid flanges, said lid flanges being mounted endwise on the hollow cylinder such that said connection opening is formed in one lid flange and said consumer and relief openings are formed in the other lid flange, further wherein said control member is a disk mounted in the lid flange via a rotary pin, said disk dividing said valve chamber into the first and second chamber sections, said disk having on each disk surface a disk segment projecting at right angles therefrom and closely abutting an inner surface of the lid flange for controlling said openings, said disk segment on each disk surface extending in an arcuate shape in a circumferential direction of the disk.

10. The valve according to claim 9, wherein said openings are arranged offset with respect to one another in the circumferential direction of the disk by the same angular amount, said consumer and relief openings being offset radially with respect to one another, a first segment portion of the disk segment being twice as long as a second segment portion of the disk segment which controls said consumer opening, and wherein the disk segment controlling said connection opening and the first segment portion of the disk segment controlling said consumer opening extend over the same angular rotational range on the disk.

11. The valve according to claim 1, wherein the valve housing includes a cylindrical bore forming the valve chamber, the control member being a displacement piston axially displaceably guided within the cylindrical bore, said piston having a piston rod, and further wherein said piston delimits the first and second chamber sections via its end surfaces facing away from one another, said openings being located centrally between the first and second chamber sections in a displacement direction of the displacement piston side-by-side in a wall of the cylindrical bore.

12. The valve according to claim 11, wherein the displacement piston is urged by a return spring, said spring holding it in a basic position in which it assumes a control position.

13. The valve according to claim 1, wherein said valve chamber is bounded by a hollow cylinder and lid flanges, said lid flanges being mounted endwise on the hollow cylinder such that said connection opening is formed in one lid flange and said consumer and relief openings are formed in the other lid flange, further wherein said control member is a disk mounted in the lid flange via a rotary pin, said disk dividing said valve chamber into the first and second chamber sections, said disk having on each disk surface a disk segment projecting at right angles therefrom and closely abutting an inner surface of the lid flange for controlling said openings, said disk segment on each disk surface extending in an arcuate shape in a circumferential direction of the disk.

14. The valve according to claim 13, wherein said openings are arranged offset with respect to one another in the circumferential direction of the disk by the same angular amount, said consumer and relief openings being offset radially with respect to one another, a first segment portion of the disk segment being twice as long as a second segment portion of the disk segment which controls said consumer opening, and wherein the disk segment controlling said connection opening and the first segment portion of the disk segment controlling said consumer opening extend over the same angular rotational range on the disk.

* * * * *